Dec. 25, 1928.  
J. F. BUHR  
1,696,468  
MULTIPLE SPINDLE DRILL HEAD  
Filed Oct. 6, 1924  
5 Sheets-Sheet 2
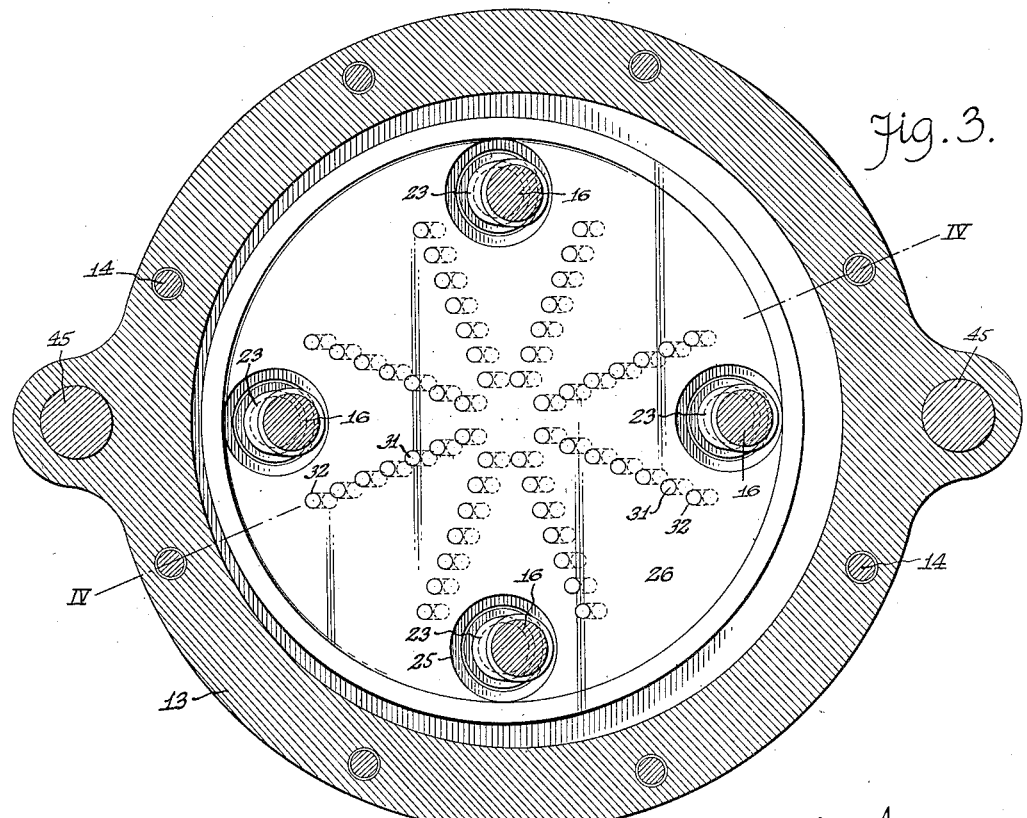
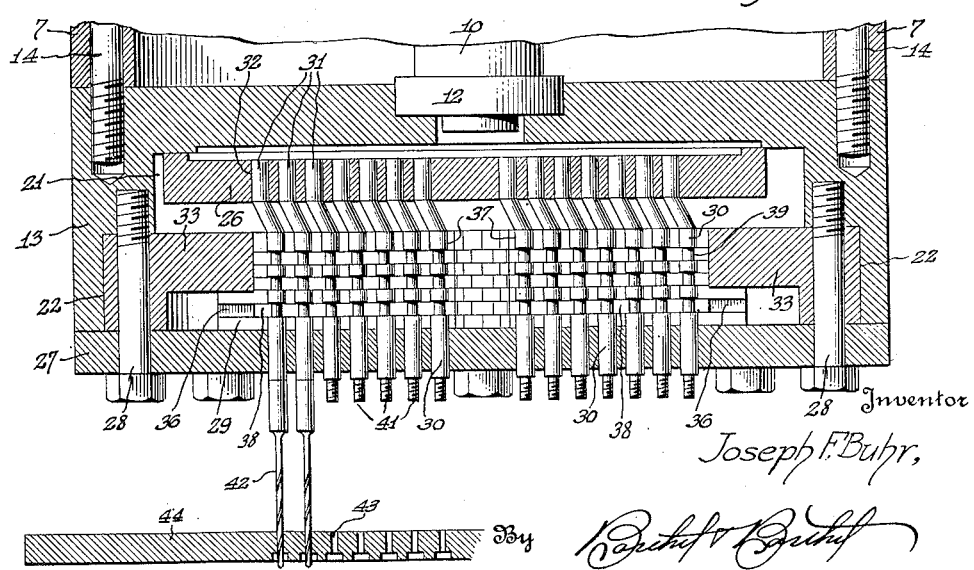
Inventor  
Joseph F. Buhr,  
By  
Attorneys Inventor
Joseph F. Buhr,
By
Attorneys Dec. 25, 1928.

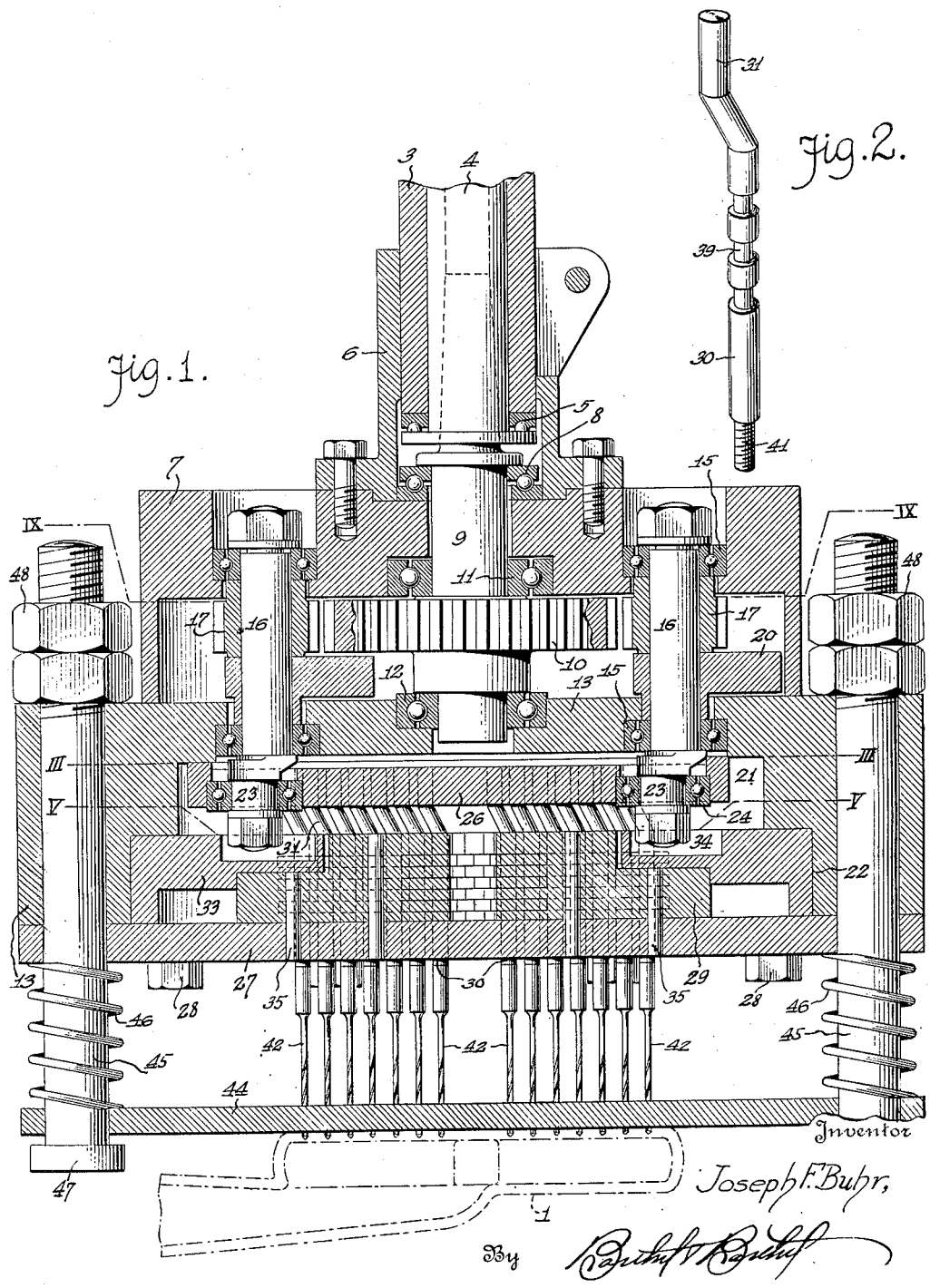

J. F. BUHR 1,696,468

MULTIPLE SPINDLE DRILL HEAD

Filed Oct. 6, 1924 5 Sheets-Sheet 4

Inventor
Joseph F. Buhr,

By

Attorneys

Dec. 25, 1928.
J. F. BUHR
1,696,468
MULTIPLE SPINDLE DRILL HEAD
Filed Oct. 6, 1924   5 Sheets-Sheet 5
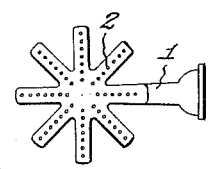
Fig. 13.
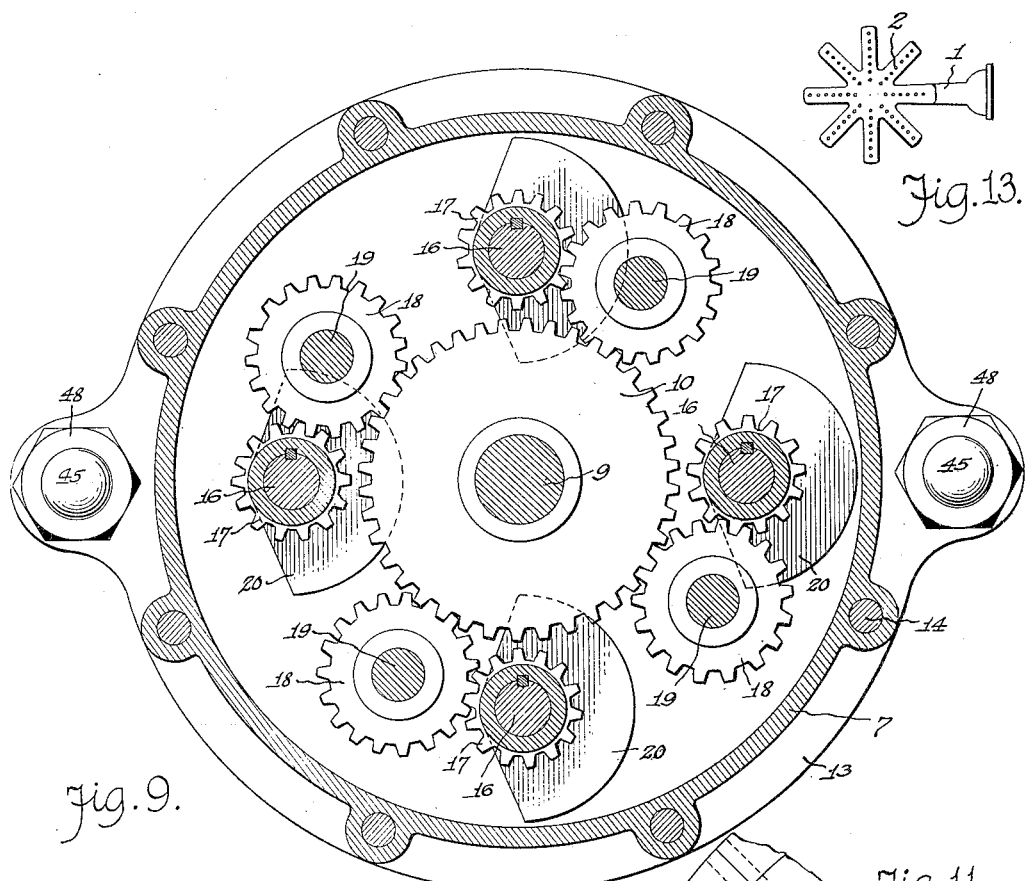
Fig. 9.
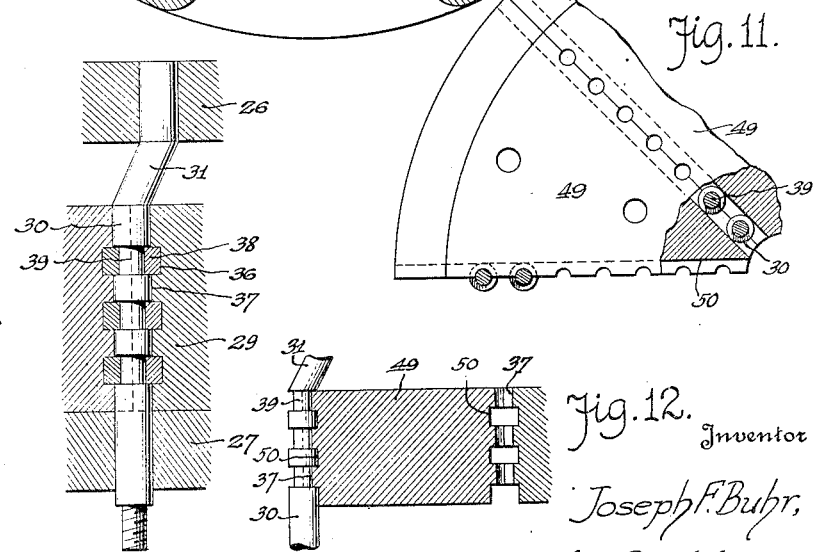
Fig. 11.
Fig. 10.
Fig. 12.
Inventor
Joseph F. Buhr,
By
Attorneys Patented Dec. 25, 1928.

1,696,468

UNITED STATES PATENT OFFICE.

JOSEPH F. BUHR, OF DETROIT, MICHIGAN.

MULTIPLE-SPINDLE DRILL HEAD.

Application filed October 6, 1924. Serial No. 741,820.

This invention relates to a multiple drill head and my invention aims to provide positive and reliable means, in a manner as hereinafter set forth, for operating a multiplicity of drilling instrumentalities in synchronism, so that a piece of work may be provided with a multiplicity of holes or recesses.

My invention further aims to provide a drill head with a multiple drill holder in which the drills are detachably held to be rotated in synchronism and this holder is of such construction as to receive any end thrust on the drills. The holder is an exchangeable element of the drill head because one arrangement of drills may not answer all purposes, therefore another holder with a different arrangement of drills may be substituted, thus utilizing the main part of the drill head for general purposes.

My invention further aims to provide a gang drill and novel means for simultaneously driving all of the drills without resorting to a complicated train of gears or other power transmission elements in order to operate the drills in synchronism. My drill head may include planetary gearing to set up the speed of the drills from the spindle or main driving element of the drill head, then again such planetary gearing may be dispensed with and rotation otherwise imparted to the multiplicity of drills.

The construction entering into the multiple drill head will be hereinafter specifically described and then claimed, and reference will now be had to the drawings, wherein Figure 1 is a vertical cross sectional view of the multiple drill head;

Fig. 2 is a perspective view of a crank shaft adapted for holding a drill;

Fig. 3 is a horizontal sectional view taken on the line III—III of Fig. 1;

Fig. 4 is a vertical transverse sectional view of a portion of the drill head taken on the line IV—IV of Fig. 3;

Fig. 9 is a horizontal sectional view of the drill head taken on the line IV—IV of Fig. 1;

Fig. 10, is an enlarged vertical sectional view of a portion of the drill holder showing one of the drill crank shafts and bearings therefor;

Fig. 11 is a plan of a portion of a drill holder devoid of bearings such as shown in Fig. 9;

Fig. 12 is a cross sectional view of the same;

Fig. 13 is a plan of an article that may be provided with holes or orifices by the multiple drill head;

Figure 5:
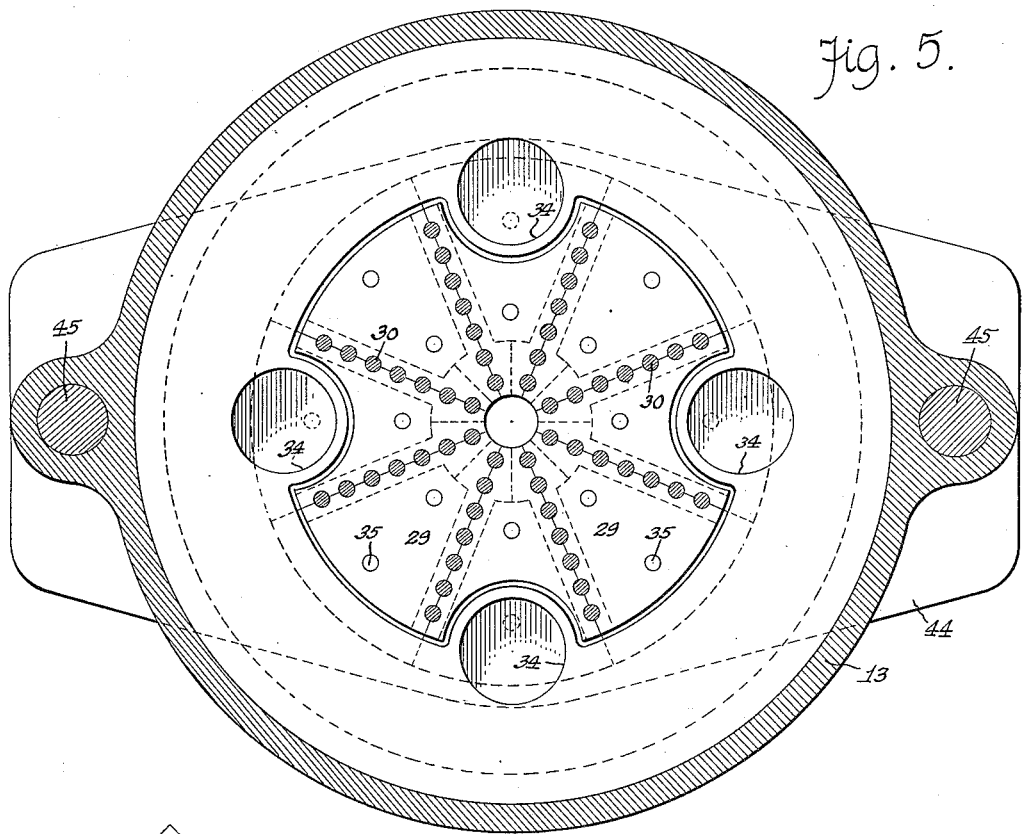
Fig. 5 is a horizontal sectional view of a drill head taken on the line V—V of Fig. 1.

Many articles, for instance a gas burner 1 have a multiplicity of openings or orifices 2 and to individually drill such openings would be a laborious and time consuming task, not only on account of the number of openings, but because of their location. It is obvious that if all of the openings can be drilled at one time and properly located that considerable time and expense may be saved, and this is what I aim to accomplish by my multiple drill head in connection with a gas burner, which is simply cited as an instance of an article having many openings peculiarly arranged.

Considering Figs. 1 to 10 inclusive, the reference numeral 3 denotes a sleeve member adapted to form part of a drilling machine and journaled in the sleeve member 3 is a drive spindle 4 provided with an anti-frictional bearing 5. Clamped on the sleeve member 3 is a supporting member 6 to which is detachably connected a casing 7 and in the lower end of said supporting member is an anti-frictional bearing 8 for an adaptor 9 which extends into the driving spindle 4 and is adapted to be driven thereby.

The lower part of the casing 7 provides clearance for a driving gear 10 carried by the adaptor 9 and said adaptor and driving gear are maintained in alinement with the drive spindle 4 by radial anti-frictional bearings 11 and 12, the former being in the casing 7 and the latter set in the top of a head 13 attached to the casing 7 by a plurality of screw bolts 14.

Mounted in the casing 7 and the head 13 are vertically disposed sets of radial anti-frictional bearings 15 and journaled in said bearings are shafts 16 provided with drive gears 17 meshing with intermediate gears 18 which mesh with the driving gear 10, said intermediate gears being rotatably mounted on shafts 19 in the casing 7, as best shown in Fig. 9. The gearing is of such ratio as to increase the speed of the drive shafts 16 relative to the drive spindle 4, and on the drive shafts 16, in the casing 7, are counterbalance members 20.

The head 13 is provided with stepped recesses 21 and 22 and into the recesses 21 extends the lower ends of the drive shafts 16, which are provided with cranks or wrist pins 23 having thereon radial anti-frictional bearings 24. The anti-frictional bearings 24 are mounted in openings 25 provided therefor in a gyratory member 26 located in the recess 21 of the head 13 and supported against the top of said head by virtue of the bearings 24 supported by the cranks 23 of the drive shafts 16.

Figure 6:
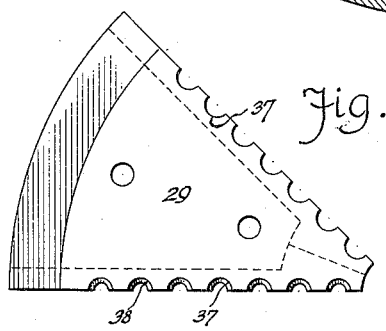
Fig. 6 is a plan of one of the sector parts of the drill holder.
Figure 8:
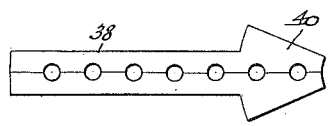
Fig. 8 is a plan of a sectional crank shaft bearing of which a few form part of a drill holder.
Figure 7:
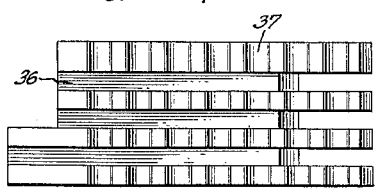
Fig. 7 is a side elevation of the same.
Figure 14:
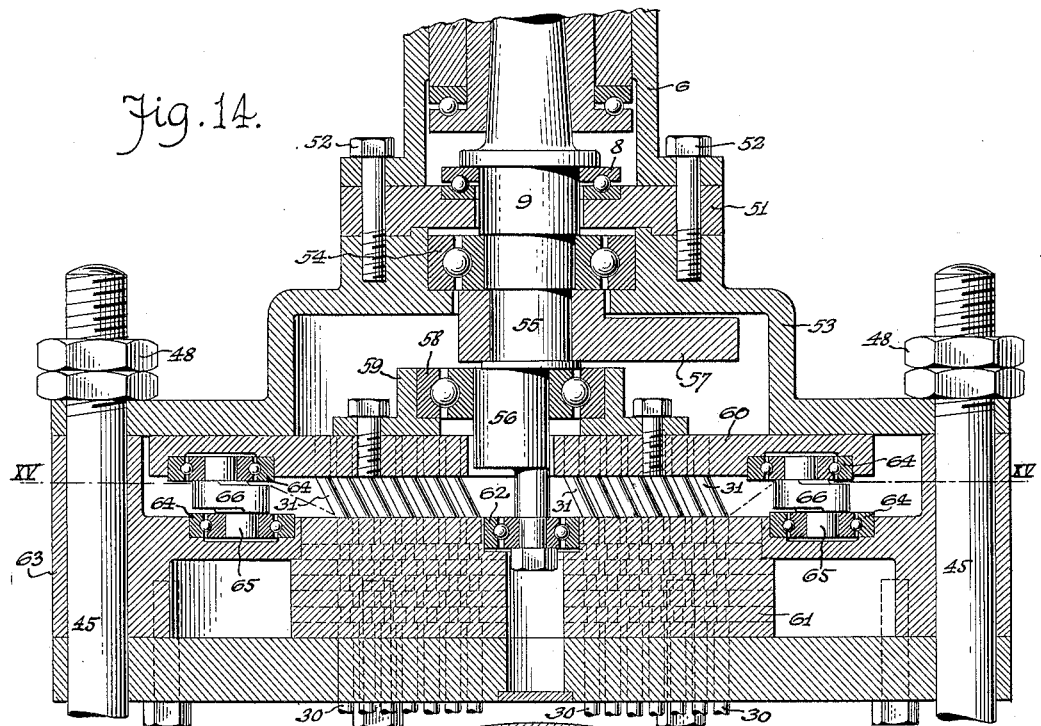
Fig. 14 is a vertical sectional view of a drill head devoid of planetary gearing.
Figure 15:
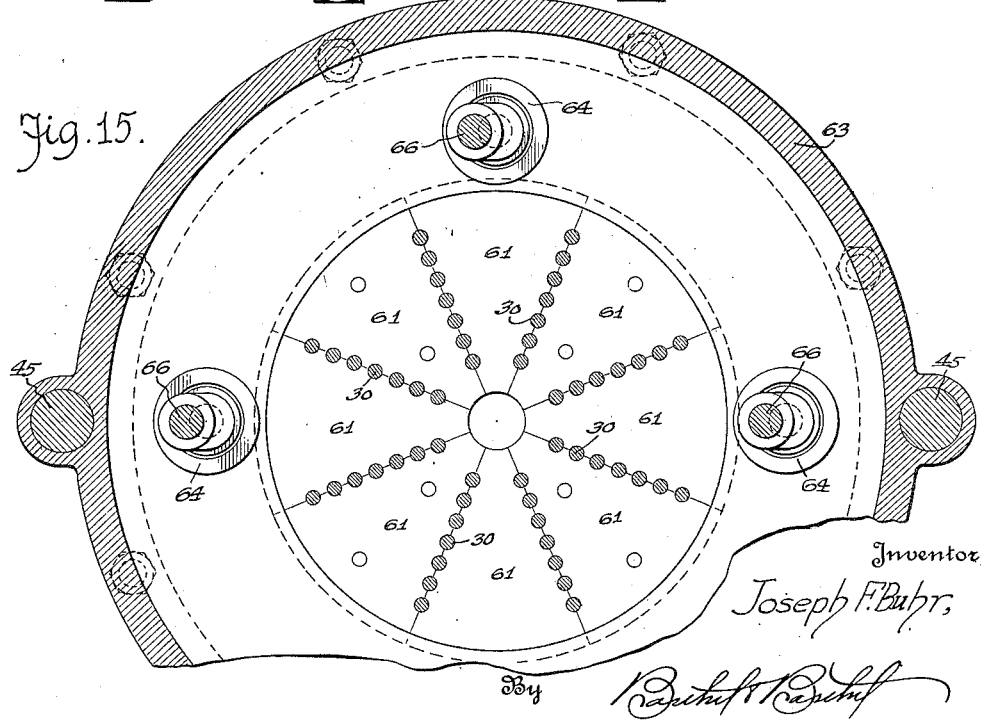
Fig. 15 is a horizontal sectional view taken on the line XV—XV of Fig. 14.

Set in the recess 22 of the head 13 and retained therein by a bearing plate 27 and screw bolts 28 is a retaining frame 33 and a sectional or multipart holder 29 for cranks shafts 30 having the upper crank ends 31 thereof journaled in openings 32 provided therefor in the gyratory member 26. The holder 29 is composed of sector parts held together by the retaining frame 33 and this retaining frame has recessed portions 34 providing clearance for the cranks or pins 23 of the drive shafts 16. The sector parts of the holder are also held together by being connected to the retaining plate 27 by dowel pins 35 and some of said sector parts are cut away to provide clearance for the portions 34 of the retaining frame 33 as best shown in Fig. 5. One of the sector parts, in its preferred form, is shown in Figs. 6 to 8 inclusive. The diverging walls of each sector part are longitudinally grooved, at 36, and are provided with vertical grooves 37, said vertical grooves accommodating the crank shafts 30 as shown in Fig. 4. Mounted in the longitudinal grooves 36 are bearing members 38 for reduced portions 39 of the crank shafts 30. The bearing members 38 have heads 40 fitting in the holder parts and the bearing members are adapted to support the crank shafts 30 while being revolved by the gyratory member 26. It is obvious that the bearing members 38 may be made of a more indurate material than the holder parts and said bearing members will assist in maintaining the crank shafts in order while the sector parts of the holder 29 are assembled.

The lower ends of the crank shafts 30 are journaled in a retaining plate 27 and are provided with screwthreaded shanks 41 or some other form of coupling for drills 42 which extend through suitable openings 43 provided therefor in a guide plate 44 yieldably supported on tie rods 45 by coiled springs 46, said tie rods extending through the retaining plate 27 and the head 13. The tie rods have heads 47 to limit the downward movement of the guide plate 44 and on said tie rods are nuts 48 which permit of the tension of the springs 46 being regulated and the guide plate correctly positioned relative to a piece of work, for instance the burner 1.

Before considering modifications of my invention, I desire to direct attention to the fact that the multiplicity of drills 42 and crank shafts 30 are substantially supported by the holder 29 so that the gyratory member 26 may revolve all of said drills in the same direction and at the same speed. Movement is imparted to the gyratory member 26 by the plurality of drive shafts 16 operated through the medium of the gearings from the drive spindle 4 with a planetary gearing increasing the rotational speed of the drills relative to the drive spindle. As the drill head is lowered in proximity to a piece of work, for instance the burner, it engages the burner and braces the ends of the drills or bits as the holes 2 are produced, and it is now apparent that the retaining plate 27, holder 29 and gyratory member 26 have been especially designed for supporting the crank shafts 30 in radially disposed rows so that at one operation all of the burner holes 2 can be produced. As pointed out in the beginning this is simply a sample of one article that may be provided with a multiplicity of holes during one operation of the drill head, and for drilling or boring other articles it may be necessary to provide special guide plates, retaining plates, holders and gyratory members whereby the multiplicity of crank shafts can be maintained in a desired formation.

In Figs. 11 and 12 I show holder sector parts 49 and instead of using the bearing members 38 to receive the reduced portions 39 of the crank shafts 30, the sector parts have longitudinal grooves 50 to receive the crank shafts 30 while the reduced portions 39 fit into the vertical grooves 37 of the holder parts. The holder parts will therefore prevent vertical shifting of the crank shafts and in this respect serve the same purpose as the bearing members 38.

Instead of using the planetary gearing shown in Figs. 1 and 9 I may drive a gyratory member direct from the adaptor 9. To do this I provide the supporting member 6 with a plate 51 to support the end thrust bearing 8 and the plate 51 is attached to the member 6 by screw bolts 52 which also support a casing 53 somewhat different from the casing 7. In the casing 3 is a radial bearing 54 corresponding to the bearing 12 in the head 13, and mounted in the adaptor 9 is a crank shaft 55 having a crank portion 56 and a counterbalance member 57. On the crank portion 56 of the crank shaft 55 is a radial anti-frictional bearing 58 supported in a cage 59 attached to the top of a gyratory member 60 which receives the upper crank ends of the crank shafts 30 journaled in a holder 61. The holder 61 is very similar to the holder 29, but has the top thereof provided with a radial anti-frictional bearing 62 for the lower end of the crank shaft 55. The frame 33 is dispensed with and a head 63 employed which will brace the holder 61 and support the gyratory member 60. For this latter purpose the head 63 and the lower face of the gyratory member 60 have radial anti-frictional bearings 64 with the bearings of the gyratory member 60 off-set relative to the bearings of the head 63 to receive the pins 65 of crank members 66, said crank members defining the gyratory movement of the member 60 relative to the head 63 and in this connection relieving the crank ends of the crank shafts 30 of stresses and strains incident to revolving said crank shafts. The head 63 is connected to the casing 53 by the tie rods 45 which support the guide plate 44.

In this modification a single drive crank shaft imparts movement to the gyratory member and instead of said member being supported from the single shaft or a plurality of drive shafts it is supported from the head. In this construction, as well as that utilizing a planetary gearing for stepping up the speed of the drills there are ample chambers for lubricant and in both constructions it is an extremely easy matter to remove the holders and gyratory members when others are to be substituted for different kinds of work. It is believed that the utility of my multiple spindle drill head will be apparent without further description and while in the drawings there are illustrated the preferred embodiments of my invention, it is to be understood that the structural elements are susceptible to such variations and modifications as fall within the scope of the appended claim.

What I claim is:—

In a multiple drill head, a drive spindle, a casing, a holder attached to said casing, a counterbalanced crank shaft driven by said spindle and having its end journaled in said holder with the counterbalance of said shaft operatable in said casing, crank shafts journaled in said holder, drills connected to said crank shafts, a gyratory member about said crank shaft below the counterbalance portion thereof and bearing against said casing, said gyratory member being operatively connected to said crank shafts for individually rotating said crank shafts, crank members supported from said holder and supporting said gyratory member against said casing, and means carried by said gyratory member within said casing adapted for imparting a gyratory movement to said gyratory member from said crank shaft, said holder being composed of a plurality of sector parts assembled with the confronting faces thereof providing bearings for the drill crank shafts.

In testimony whereof I affix my signature.

JOSEPH F. BUHR.